US008896617B2

(12) United States Patent
Praun et al.

(10) Patent No.: US 8,896,617 B2
(45) Date of Patent: Nov. 25, 2014

(54) MULTI-RESOLUTION TEXTURE AGGREGATION

(71) Applicants: Emil Constantin Praun, Union City, CA (US); Paul Steven Strauss, Sunnyvale, CA (US); Costa Touma, Haifa (IL); Tushar Udeshi, Broomfield, CO (US)

(72) Inventors: Emil Constantin Praun, Union City, CA (US); Paul Steven Strauss, Sunnyvale, CA (US); Costa Touma, Haifa (IL); Tushar Udeshi, Broomfield, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/768,729

(22) Filed: Feb. 15, 2013

(65) Prior Publication Data
US 2013/0286031 A1     Oct. 31, 2013

Related U.S. Application Data

(62) Division of application No. 12/419,704, filed on Apr. 7, 2009, now Pat. No. 8,379,037.

(60) Provisional application No. 61/044,869, filed on Apr. 14, 2008.

(51) Int. Cl.
*G09G 5/00*     (2006.01)
*G06T 11/00*    (2006.01)

(52) U.S. Cl.
CPC ............. *G06T 11/001* (2013.01); *G09G 5/00* (2013.01)
USPC ............ 345/582; 345/428; 345/501; 345/619

(58) Field of Classification Search
USPC .................... 345/501, 428, 582, 619
See application file for complete search history.

(56) References Cited

PUBLICATIONS

Buchholz et al., "View-Dependent Rendering of Multiresolution Texture-Atlases," IEEE Visualization, pp. 215-222 (2005).

*Primary Examiner* — Maurice L McDowell, Jr.
(74) *Attorney, Agent, or Firm* — Marshall, Gerstein, Borun LLP

(57) ABSTRACT

Systems and methods for aggregation of textures at multiple resolution levels are described herein. An embodiment includes a preprocessing system that aggregates textures associated with objects of interest at multiple resolution levels. Individual textures may have a "pyramid" of resolution levels, and aggregated textures may be combined into a "tree" or a "forest". Additionally, a texture forest may also be organized spatially and in resolution using the nodes of a quadtree, based on the 3D coordinates of the geometric primitives using each texture. A client identifies a resolution level for each object of interest in an image frame, groups objects based on resolution levels. The client may then test one texture coordinate per object at the beginning of a texture tree, recursively towards each child node of the tree, accumulating texture replacement transforms as a texture matrix. The client may then draw all the textures with the appropriate transform.

10 Claims, 10 Drawing Sheets

MULTI-RESOLUTION TEXTURE AGGREGATION

CROSS-REFERENCE TO RELATED APPLICATION

This application is a divisional of and claims priority to U.S. patent application Ser. No. 12/419,704, filed on Apr. 7, 2009, and entitled "Multi-Resolution Texture Aggregation," which claims the benefit of U.S. Provisional Patent Application 61/044,869, filed on Apr. 14, 2008, the entire disclosures of which are hereby expressly incorporated by reference herein.

BACKGROUND

1. Field of the Invention

The present invention relates to computer graphics technology.

2. Background Art

In computer graphics applications, complex shapes and structures are formed through rendering of more simple objects, referred to as primitives. Graphics primitives may include lines, characters, areas such as triangles and ellipses, and solid or patterned shapes such as polygons, spheres, cylinders and the like. Graphics cards are more efficient when they draw large groups of primitives together. For that, all primitives must share the same state, including applied textures. Grouping primitives together may become challenging when textures need to be applied to those primitives at different levels of resolution. Systems and methods are needed allowing grouping or aggregation of textures at multiple resolution levels.

BRIEF SUMMARY

The present invention relates to aggregation of texture pyramids at multiple resolution levels. In an embodiment, quadtrees may be used to organize data spatially. Individual textures may have a "pyramid" of resolution levels, and aggregated textures may form a "tree" or a "forest".

An embodiment includes, obtaining a plurality of aggregated textures, determining a resolution level for the textures; and placing the aggregated textures at one or more nodes of a quadtree based on the determining step.

Another embodiment includes, determining a resolution level for each object of interest in a frame, recursively traversing a quadtree that includes one or more objects of interest sharing the same resolution level, testing a texture coordinate associated with the objects of interest, identifying a child texture sub-window the texture belongs to based on the testing. step, accumulating texture replacement transforms concurrently with the traversing step; and drawing all primitives when said recursively traversing step reaches a desired level of the quadtree based on output of the accumulating step.

In this way, textures may be aggregated at multiple resolutions by a preprocessing system. Furthermore, a client may render the textures at multiple resolutions, with different aggregation patterns at each resolution, using a single set of texture coordinates for the geometric objects. Texture coordinates corresponding to each point, or vertex, of the geometric objects, are not modified when the texture resolution changes; instead, they are affected on the graphics card by a transformation matrix corresponding to the respective texture node in a quadtree.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
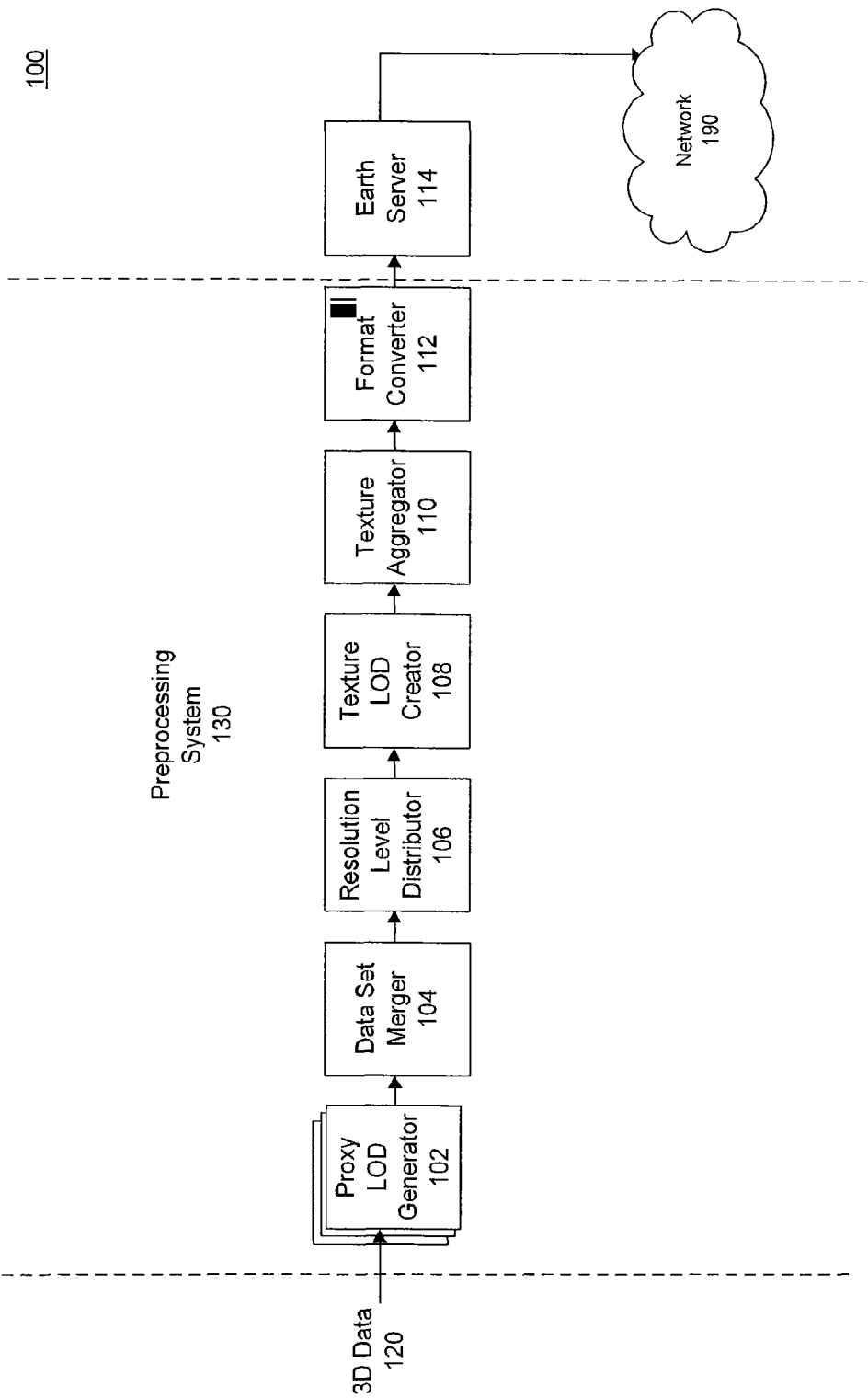
FIG. 1 is an architecture diagram illustrating a preprocessing system according to an embodiment of the invention.

The present invention relates to multi-resolution texture aggregation. In embodiments of the invention, a preprocessing system aggregates textures associated with objects of interest to form a forest of texture trees. Each node in the tree may represent an aggregated atlas texture at a certain resolution. Additionally, each texture tree is associated with a set of objects (e.g. buildings). A client application traverses the texture tree(s) and builds a texture transform used to render the primitives associated with each texture node. A texture forest can be associated with the nodes of a multi-resolution spatial subdivision structure used to organize the objects and primitives to be rendered. As an example, for geo-spatial applications, a spatial subdivision structure can be a quadtree over the latitude/longitude space of the Earth.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "frame" used herein refers to an image which may used to compose an image stream. As an example, one or more frames may be transmitted in sequence to a user or rendered interactively. These examples are illustrative and are not intended to limit the invention.

This detailed description of the embodiments of the present invention is divided into several sections as shown by the following table of contents.

TABLE OF CONTENTS

1. Pre-processing System
2. Client
2.1 Exemplary Overall Operation
2.2 Discovery of Roots of Quadtrees 2.3 Selection of LODs for Geometry and Texture Objects
2.4 Revisiting LOD Decisions
2.5 Combining Geometries
2.6 Scene graphs
2.7 Scene graph Generation
2.8 Scene graph Display
3. Conclusion I. Pre-Processing System In an embodiment, a preprocessing system that constructs texture pyramids for a set of given texture images and aggregates corresponding pyramid levels from multiple textures. Since, maximum texture size in pixels may be limited, one can achieve more aggregation at the coarse end of the texture pyramids, and less at the fine resolution end since individual textures are already large. Aggregated textures may thus form a tree or a forest where the textures in any given node are reduced resolutions of all the textures in the child nodes, aggregated together. The objects of interest using the textures have their texture coordinates modified to correspond to aggregated coarsest resolutions of the textures. As an example, the aggregated textures at a certain resolution may be stored at the nodes of a quadtree data structure. Furthermore, for example, a quadtree is used to organize data spatially and a texture pyramid may be a chain of textures (e.g. an original texture pyramid, together with a minified version of itself, and a twice-minified version, and three times minified, etc. all the way to a single pixel.) Additionally for example, in a "pyramid" a same whole image may be present at each level, while in a quadtree, a node is the equivalent of the union of its four child nodes. These examples are illustrative and are not intended to limit the invention.

This section describes a system for generation of texture forests according to an embodiment of the invention illustrated in FIG. 1.

FIG. 1 shows system 100. System 100 includes a preprocessing system 130, earth server 140 and network 190. Preprocessing system 130 further includes a proxy level of detail (LOD) generator 102, a data set merger 104, a resolution level distributor 106, a texture LOD creator 108, a texture aggregator 110, and a format converter 112. Preprocessing system 130 can be coupled to earth server 114. Preprocessing system 130 can communicate with network 190 through earth server 114. In further embodiment, preprocessing system 130 can also be coupled directly to network 190 through connections not shown for c clarity.

In an embodiment, preprocessing system 130 (and its components including a proxy level of detail (LOD) generator 102, a data set merger 104, a resolution level distributor 106, a texture LOD creator 108, a texture aggregator 110, and a format converter 112) can include pipelined processing or other processing arrangements to carry out its tasks as would be apparent to a person skilled in the art given this description.

Preprocessing system 130 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Preprocessing system 130 can also be implemented across a plurality of computing devices, a clustered computing environment or a server farm.

Network 190 can be any type of network or a combination of networks such as a local area network, wide area network or the Internet. Network 190 may be a form of a wired network or a wireless network. In an embodiment, earth server 114 may communicate over network 190.

Proxy LOD generator 102 receives three dimensional data 120. Three dimensional data 120 may include image data from various sources, including but not limited to LIDAR (Light Detection and Ranging) imagery, user contributed data, topographic data and street and aerial imagery. In an embodiment, proxy LOD generator 102 uses three dimensional data 120 to generate proxy LODs.

Data set merger 104 merges textures associated with three dimensional data 120 obtained from a plurality of sources into one or more data sets.

Resolution level distributor 106 may distribute the one or more objects of interest included in the datasets obtained from data set merger 104 and their the proxy LODs generated by proxy LOD generator 102 to various resolution levels of a geo-spatial quadtree.

Texture LOD generator 108 generates a resolution pyramid for each texture used by the objects of interest. In an embodiment, texture LOD generator 108 may store each texture having a certain resolution at a node of a geo-spatial quadtree data structure, where the resolution of a texture level as applied to an object of interest (e.g., "1 meter per pixel") approximately corresponds to the resolution of the quadtree node where it is stored (e.g., "0.6 meters per pixel").

Texture aggregator 110 aggregates a plurality of textures at multiple resolutions, creating several texture trees, or a forest altogether. Each texture tree is associated with a set of objects (for our application, buildings) made up of triangles (corresponding to facades, roofs, etc). In an embodiment, texture aggregator 110 may store each texture having a certain resolution at a node of a multi-resolution spatial data structure organizing the objects of interest (e.g. a quadtree). Textures having the same resolution when applied to an object of interest may share a common level in the quadtree.

In an embodiment, each node in a texture tree represents an aggregated atlas texture at a given resolution. It can have zero or more children, containing textures at a double resolution in each of the two texture dimensions. Such child textures can replace a rectangular sub-region of a parent node texture. The sub-regions corresponding to different child nodes may not overlap.

Figure 5A:
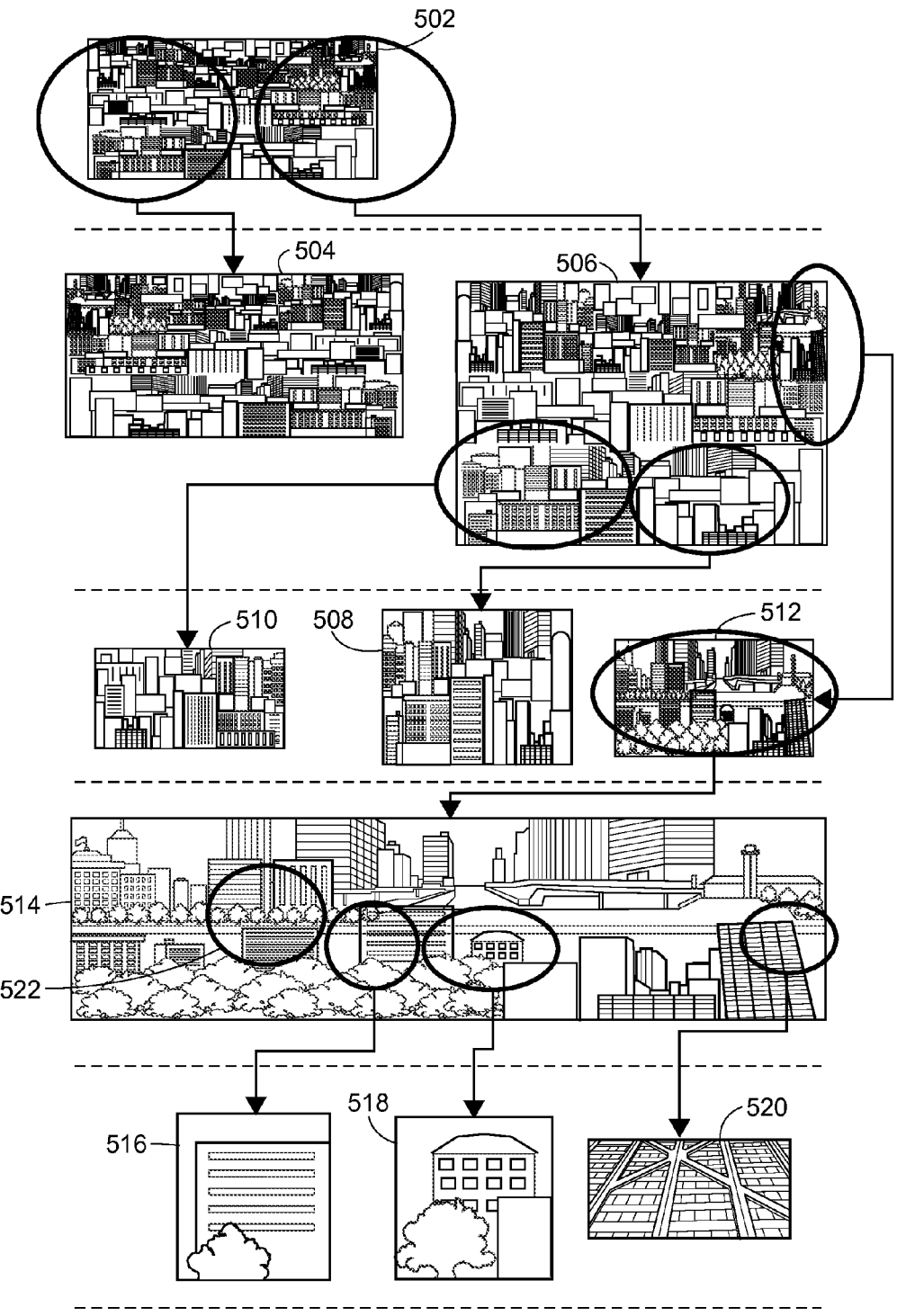
FIG. 5A and FIG. 5B illustrate an exemplary part of a tree of aggregated textures at different resolution levels which may be used to create a forest of textures.
Figure 5B:
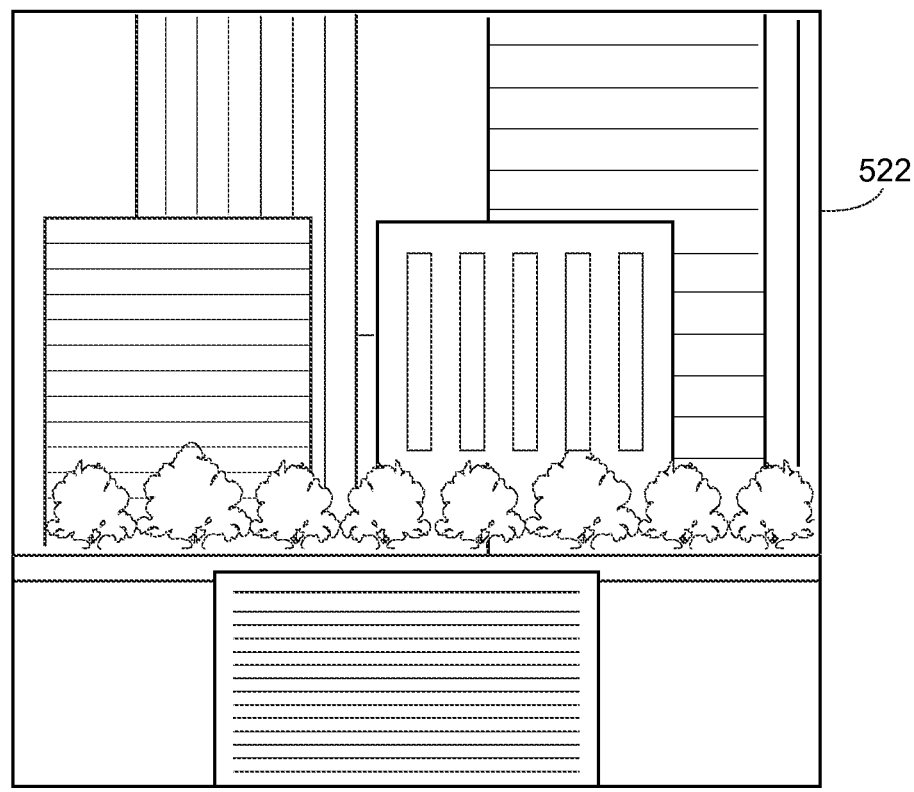

FIG. 5A and FIG. 5B illustrate exemplary aggregated textures at different resolution levels. As an example, aggregated textures 504 and aggregated textures 506 are stored at different nodes of the geo-spatial quadtree but at the same level (they have similar "meters per pixel" resolutions when applied to the objects of interest). Similarly, aggregated textures 516 and aggregated textures 518 and aggregated textures 520 share the same level in the quadtree. Similarly aggregated textures 510, 508 and 512 share the same level in the quadtree. Aggregated texture 514 represents aggregated texture 512 at a different resolution level and hence associated with a different level of the quadtree. FIG. 5B illustrates an exemplary aggregated texture 522 appearing at a leaf node of a texture tree.

In an embodiment, the objects of interest using textures from a given LOD tree in the forest are stored at the same geo-spatial quadtree node where the root of the texture tree is also stored.

Format converter 112 may convert the textures aggregated by texture aggregator 110 into a format used by earth server 114 to transmit the textures over network 190. According to a feature, any compressed format may be used including, but not limited to a highly compressed format. As an example, format converter 112 may convert textures to the JPEG 2000 image format. JPEG 2000 is a highly compressed image compression standard known to those skilled in the art.

Earth server 114 may transmit both textures and three dimensional geometries over network 190. At run time, for example, earth server 114 may fulfill requests made by client 210. In one exemplary embodiment, earth server 114 may include a web server or may be coupled to communicate with a web server at the same or a different location. A web server is a software component that responds to a hypertext transfer protocol (HTTP) request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include hypertext markup language (HTML), extensible markup language ( ){ML), documents, videos, images, multimedia features, or any combination thereof. This example is strictly illustrative and does not limit the present invention.

2. Client

In an embodiment, a client application doing interactive rendering identifies a desired resolution level for each object of interest in an image frame to be rendered and descends or traverses the aggregate texture pyramid forest to the appropriate level. All objects using the same aggregated texture may be grouped and drawn together. To select the appropriate texture node from the forest, the client application may test one texture coordinate at the beginning of a quadtree, recursively towards each child node of the quadtree, accumulating texture replacement transforms as a texture matrix. The client may then draw all the objects with an appropriate transform.

In an embodiment, client 210 processes a texture forest generated by preprocessing system 130 and transmitted in part by earth server 114 over network 190. Client 210 may choose which texture resolution to use when rendering a part of an object of interest (e.g. a building facade) and use the same single set of texture coordinates for all possible resolutions of that texture in a texture tree. Pre-vertex texture coordinates need not be computed at each resolution level while traversing the texture tree.

In an embodiment, the nodes of texture trees may be associated with the nodes of a spatial structure such as a quadtree. Since it may be impractical to transmit the whole texture forest over the network to a client, the client can use the geo-spatial quadtree to decide what parts of the forest to fetch, i.e. it will only download the parts of the forest that may be needed to render the scene currently in view.

Figure 2:
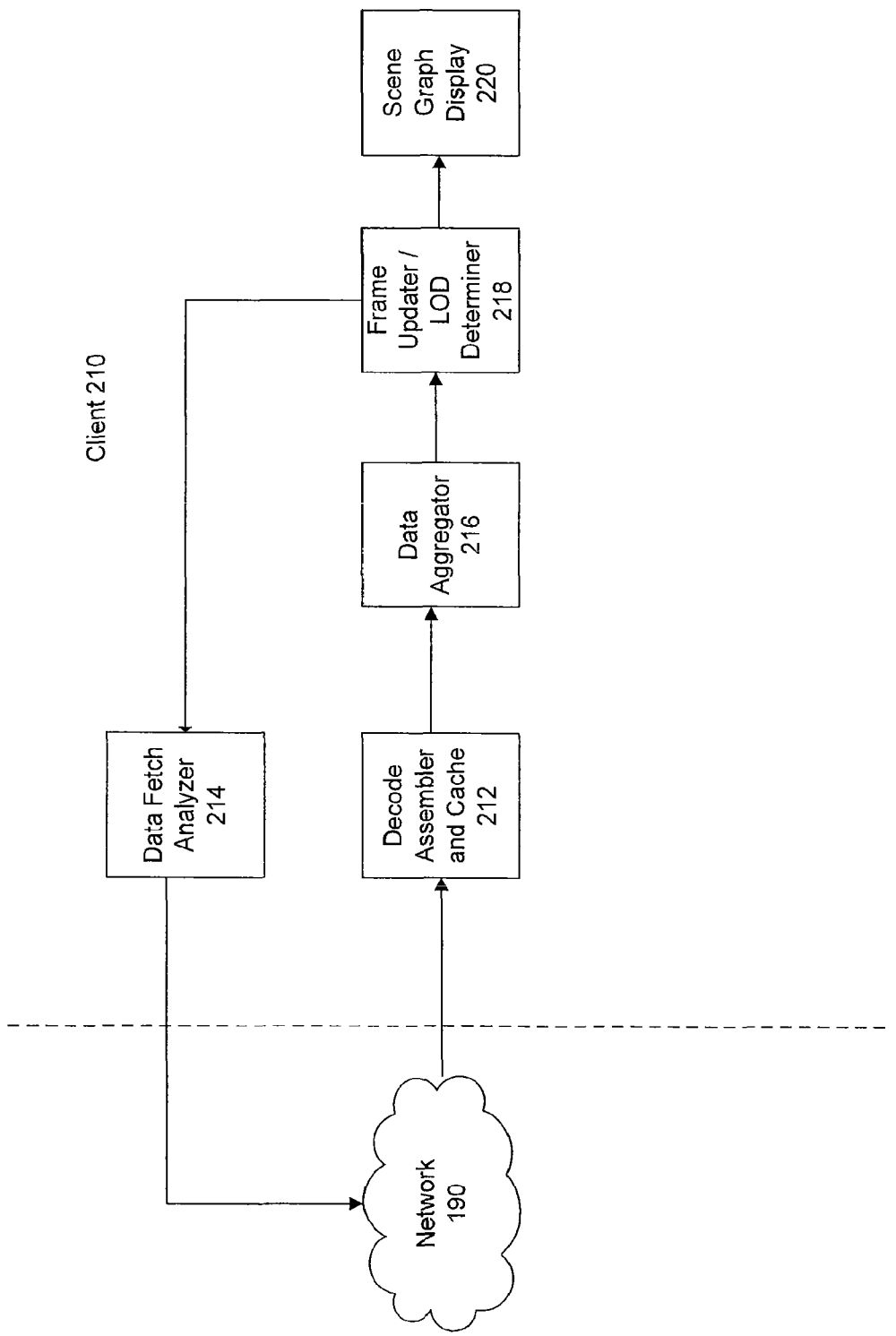
FIG. 2 is an architecture diagram of a client according to an embodiment of the invention.

FIG. 2 illustrates client 210 according to an embodiment of the invention. Client 210 includes data fetch analyzer 214, decode assembler and cache 212, data aggregator 216, frame updater/LOD determiner 218 and scene graph display 220.

Client 210 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Client 210 may also be implemented across multiple computing devices.

In an embodiment, earth server 114 transmits data to network 190. Data transmitted by earth server 114 over network 190 may be received by client 210.

In an embodiment, decode assembler and cache 212 receives data from network 190. As an example, this data may comprise three dimensional data relating to geometries of various objects of interest in a scene. Furthermore, data may comprise of image data in highly compressed formats (such as JPEG 2000). As an example, decode assembler and cache 212 may convert the data from a received format to another format that may be less efficiently compressed but more suitable for direct rendering by client 210. Additionally decode assembler and cache 212 may assemble and store the decoded data into data sets that may be used by client 210 for further processing.

Data aggregator 216, may receive a plurality of data sets that may include texture and geometry data relating to objects of interest and other objects in a scene. Data aggregator 216 may then aggregate the data sets before they are provided to the frame updater/LOD determiner 218. As an example, data aggregator 216 may further aggregate textures and it may aggregate geometric objects using the same texture trees. Aggregation of various data sets may improve efficiency of client 210.

Similar to textures having multiple resolution levels organized in a tree, geometric objects can have multiple, progressively more complicated representations organized in LOD trees (geometry LOD trees). For example, coarse representations of objects may be generated in the preprocessing system 130 by proxy LOD generator 102.

Frame updater/LOD determiner 218 processes a plurality of geometry LOD trees and texture trees received from data aggregator 216. In an embodiment, frame updater/LOD determiner 218 may determine LODs for all geometry and texture objects and then update the LODs based on resource budgets. Resource budgets are described in detail in section 2.4 of the description.

Figure 3:
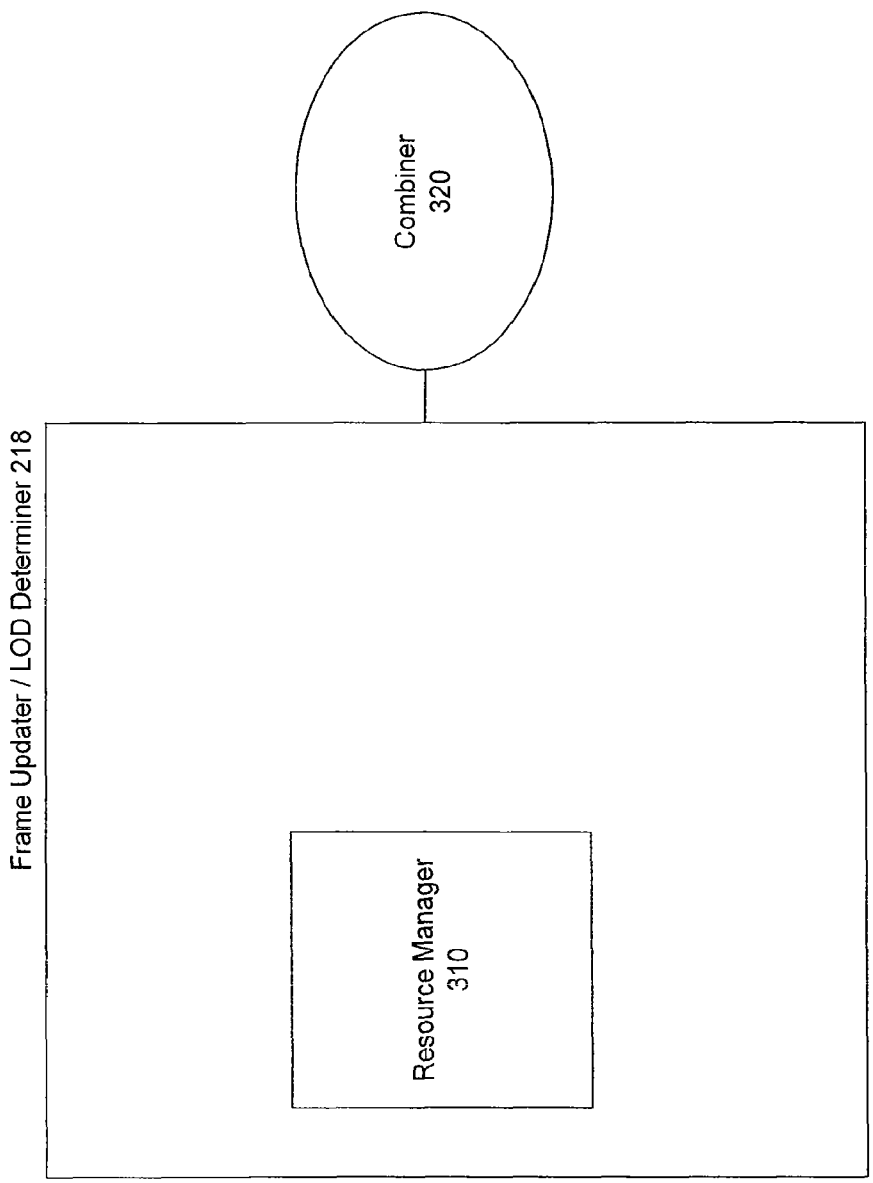
FIG. 3 is a diagram illustrating an exemplary embodiment of a frame updater/LOD determiner according to an embodiment of the invention.

FIG. 3 illustrates an exemplary embodiment of a frame updater/LOD determiner 218 according to an embodiment of the invention. As illustrated in FIG. 3 frame updater/LOD determiner 218 may include resource manager 310 and combiner 320. The operation of frame updater/LOD determiner 218 including resource manager 310 and combiner 320 is described in detail further in the description.

2.1 Exemplary Overall Operation

Figure 4A:
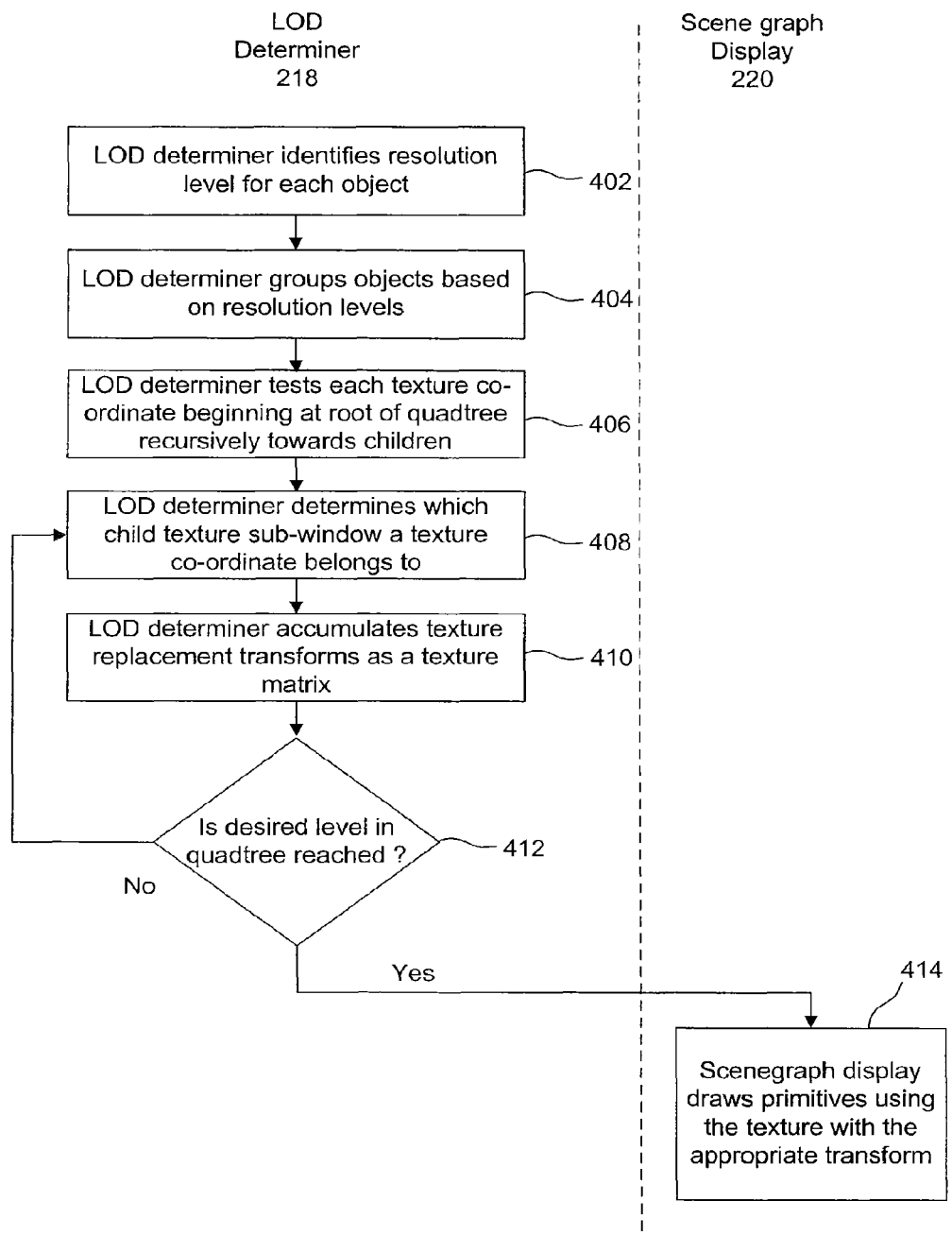
FIG. 4A is a flowchart illustrating an exemplary overall operation of the systems described in FIG. 2 and FIG. 3 according to an embodiment of the invention.

The overall operation of frame updater/LOD determiner 218 can be divided into several separate phases as illustrated in FIG. 4. FIG. 4 illustrates method 400 for generating and updating scene graphs based on LOD decisions.

Method 400 begins at step 402 where frame updater/LOD determiner 218 identifies a resolution level for each object of interest. As an example, not intended to limit the invention, a resolution level may be expressed as a "meters/pixel ratio". Additionally, for example, an object of interest may be a building.

Frame updater/LOD determiner 218 may then group objects of interest based on resolution levels (step 404). From a perspective of client 210, a group of objects of interest may share a common resolution level based on image data that may be obtained from preprocessing system 130.

Frame updater/LOD determiner 218 may then test one texture coordinate per textured object part, beginning at the root of a texture quadtree recursively towards child quadnodes (step 406). As an example, texture coordinates are the means by which texture positions are assigned to vertices. The per-vertex assignment of texture coordinates, for example, may be used to map a texture to rendered geometry. A textured object part, for example may refer to an object or any geometry to which a texture has been applied. Traversal of a quadtree according to embodiments of the invention is described in detail in sections 2.2, 2.3 and 2.4 of the description. Step 406 is described in greater detail further in the description with reference to FIG. 4B.

Frame updater/LOD determiner 218 may then determine which child texture sub-window or sub-region a texture coordinate belongs to (step 408). In an embodiment, each node in a texture tree represents an aggregated atlas texture at a given resolution. It can have zero or more children, containing textures at a double resolution in each of the two texture dimensions. Such child textures can replace a rectangular sub-window or sub-region of a parent node texture. The sub-regions corresponding to different child nodes may not overlap. Thus, in step 408, frame updater/LOD determiner may determine which child texture sub-window or sub-region a texture coordinate belongs to using metrics that include but are not limited to aggregated texture co-ordinates and resolution.

Frame updater/LOD determiner 218 may then accumulate texture replacement transforms as a texture matrix (step 410). In an embodiment frame updater/LOD determiner 218 need not calculate texture coordinates at each resolution level while traversing the texture tree. Texture coordinates corresponding to each point, or vertex, of the geometric objects, are not modified when the texture resolution changes; instead, they are affected on the graphics card by a transformation matrix corresponding to the respective texture node in a quadtree using the accumulated texture replacement transforms in step 410.

Frame updater/LOD determiner 218 may then check if a desired resolution level has been reached (step 412). Instead of computing the effective applied resolution of a given texture in the tree by visiting all triangles using it, frame updater/LOD determiner 218 may infer that resolution from the resolution of the associated geo-spatial quadtree node where the texture node has been placed by the preprocessing system.

If a desired level has not been reached (step 412), method 400 proceeds to step 408. If a desired level has been reached (step 412), scene graph display 220 draws primitives using the texture with the appropriate transform accumulated in step 410.

Although method 400 illustrates several Her; separately, it is to be appreciated that one or more steps may be combined into a single step or all of the above phases may occur concurrently or in any sequence.

In this way, frame updater/LOD determiner 218 generates and updates scene graphs based on LOD decisions. A scene graph generated by frame updater/LOD determiner 218 may be displayed by scene graph display 220.

2.2 Discovery of Roots of LOD Trees

In this phase, data fetch analyzer 214 processes each node of the geo-spatial quadtree that intersects a current view to be rendered by the client and whose resolution may not have sufficient detail for the current view. Data fetch analyzer 214 downloads metadata for these quadnodes from earth server 114. The metadata for the quadnodes may indicate that the quadnodes include geometric objects or textures for the quadnodes that may be downloaded.

For each frame, frame updater/LOD determiner 218 scans the nodes of the geo-spatial quadtree that are in view and lack a certain level of detail. If a node contains geometric objects or textures, the objects and textures are checked to see if they have coarser representations or resolutions in other quad-tree nodes. If none of the nodes have coarser representations or resolutions, the quadtree node is added to a list of sub-tree roots for the current frame.

In this way, frame update OD determiner 218 scans the nodes of the geo-spatial quadtree.

2.3 Selection of LODs for Geometry and Texture Objects

In computer graphics, accounting for level of detail involves decreasing the complexity of a three dimensional object representation as it moves away from the viewer or according to metrics such as object importance, eye-space speed, or eye-space position. Level of detail techniques may increase efficiency of rendering by decreasing the workload on graphics pipeline stages, for example, vertex transformations. Choosing the correct level of detail for a geometry and its textures may require knowledge of its distance to a viewpoint.

In an embodiment, frame updater/LOD determiner 218 computes a meters/pixel ratio for a 3D point in the world assuming a small surface oriented perpendicular to (the view vector at that point). A meters/pixel ratio may be used to compute a target resolution level, corresponding to a level iii a geo-spatial quadtree.

For some quadtree nodes rendered in the distance, the target level may not differ much over the spatial extents of the entire node, so a single level can be used for all objects associated with that quadnode. For closer and/or larger tiles, the target level must be computed individually for each object. It may be beneficial to compute target levels for multiple objects at once rather than for each object individually as this may save time on a client and improve the rendering frame rate.

In some cases objects of interest may be cut across quadtree node boundaries. In some embodiments it may be desirable to not cut them but let them span multiple nodes, since cuts may be problematic when combining different LOD representations (potentially resulting in visual cracks and other visual abnormalities). When objects are not cut, they can be stored at a single node, and all other nodes that intersect it can keep references to it. Because of such references, several nodes may have differing opinions about the target resolution for an object. Therefore, when not computing levels for objects individually but using the quadnode computation instead, one has to visit all quadnodes that intersect the object in order to accurately determine the correct LOD.

Figure 4B:
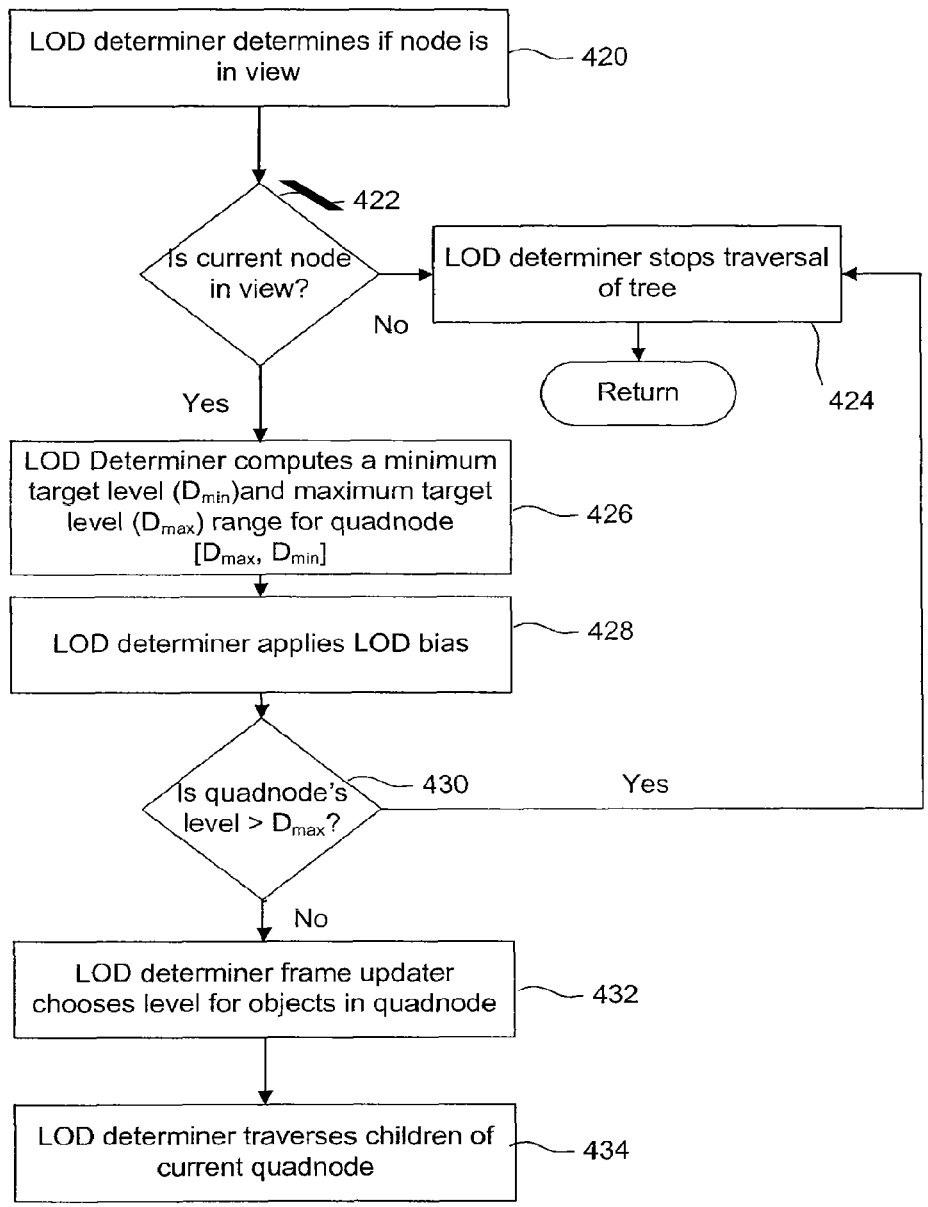
FIG. 4B and FIG. 4C are flowcharts illustrating the determination of level of detail and traversal of a quadtree according to an embodiment of the invention.

FIG. 4B illustrates method 406. Method 406 involves traversal of a quadtree to determine LODs according to an embodiment of the invention. Method 406 illustrates an exemplary embodiment of step 406 of method 400 and is not intended to limit the invention. In an embodiment, steps included in method 406 may be performed for each sub-tree root quadnode that may be collected as described in section 2.1 of the description.

Method 406 begins with determining if a quadnode is in view (step 422). As an example, a quadnode may be considered to be in view its spatial extents intersect the extents of the scene rendered at the current frame by client 210. If a node is not in view (step 422) stops traversing the current branch of a quadtree that includes the node that is not in view (step 424) and method 406 returns. Returning to step 422, if a node's extents are completely in view (step 422), frame updater/LOD determiner 218 computes a minimum and maximum target level range for the node (step 426). Additionally, frame updater/LOD determiner 218 may notify all descendent nodes of the node that they are in view, so that the view computation need not be repeated for these descendent nodes.

If the node is partially in view, the computation may later have to be repeated for each child node by frame updater/LOD determiner 218.

Frame updater/LOD Determiner 218 may then apply a predetermined LOD bias to adjust a minimum and maximum target level range (step 428). As an example, this pre-determined LOD bias may be provided by preprocessing system 130 over network 190, or may be selected by the user to accommodate rendering on less powerful graphics systems. Frame updater/LOD determiner 218 then checks if a quadnode's target level is greater than a predetermined level, for example, $D_{max}$, (step 430). As an example $D_{max}$ may be computed by frame updater/LOD determiner 218 in step 426. If a quadnode's level is greater than $D_{max}$ (step 430), the viewer may be too far from the node to warrant rendering data with such detailed resolution, so frame updater/LOD determiner stops traversing a current branch of a quadtree (step 424). Returning to step 430, if a quadnode's level not greater than $D_{max}$, frame updater/LOD determiner 218 chooses a target level for objects of interest associated with the quadnode (step 432). Frame updater/LOD determiner 218 then traverses the children of the current quadnode (step 434).

Figure 4C:
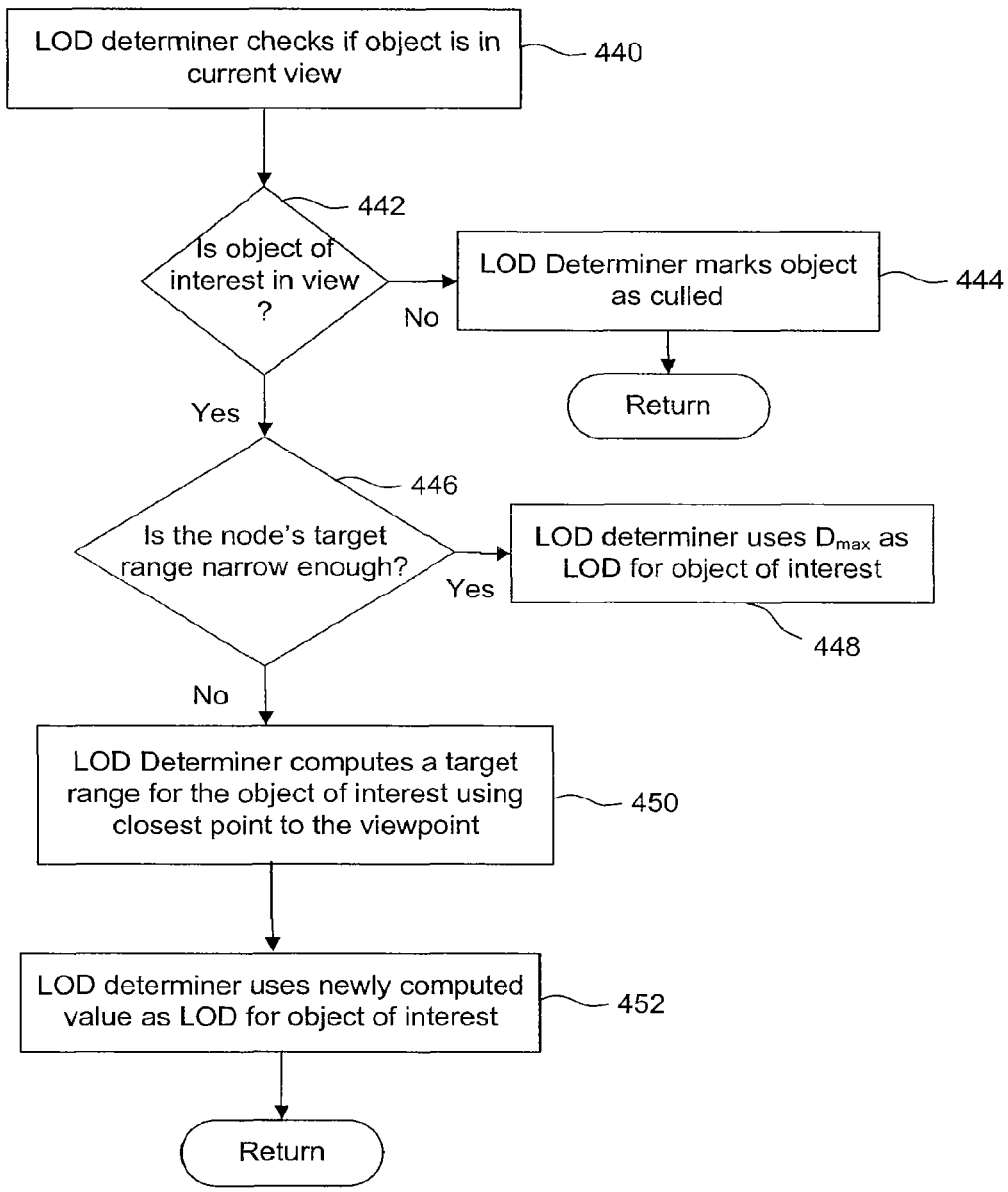

FIG. 4C illustrates step 432 of method 406 in greater detail. In an embodiment, method 432 is performed for each object of interest in a quadnode. Method 432 begins with frame updater/LOD determiner 218 checking if an object of interest in view (step 440). If an object of interest is not in view (step 442), frame updater/LOD determiner 218 marks the object of interest as culled (step 444) and method 432 returns. If the object of interest is in view (step 442), frame updater/LOD determiner checks if the node's target range is narrow enough to serve as a reasonable approximation for the level of all objects associated with the node (step 446). If the node's target range is narrow enough (step 446), frame updater/LOD determiner 218 uses a current value of $D_{max}$, as a LOD value for the object of interest (step 448). If the node's target range is too wide (not narrow enough) (step 446), frame updater/LOD determiner 218 computes target level range for the object of interest, using its closest point to the viewpoint (step 450). Frame updater/LOD determiner then uses the value obtained in step 450 as a LOD for the object of interest (step 452).

In this way, frame updater/LOD determiner 218 determines LODs according to an embodiment of the invention.

2.4 Revisiting LOD Decisions

In an embodiment, after selection of LODs for geometry and texture objects as described in section 2.2 and 2.3 is complete, frame updater/LOD determiner 218 may revisit some of the LOD decisions made in order to satisfy various resource budgets. As an example various resource budgets may depend on texture memory, update bytes per frame and main memory at client 210.

Figure 6:
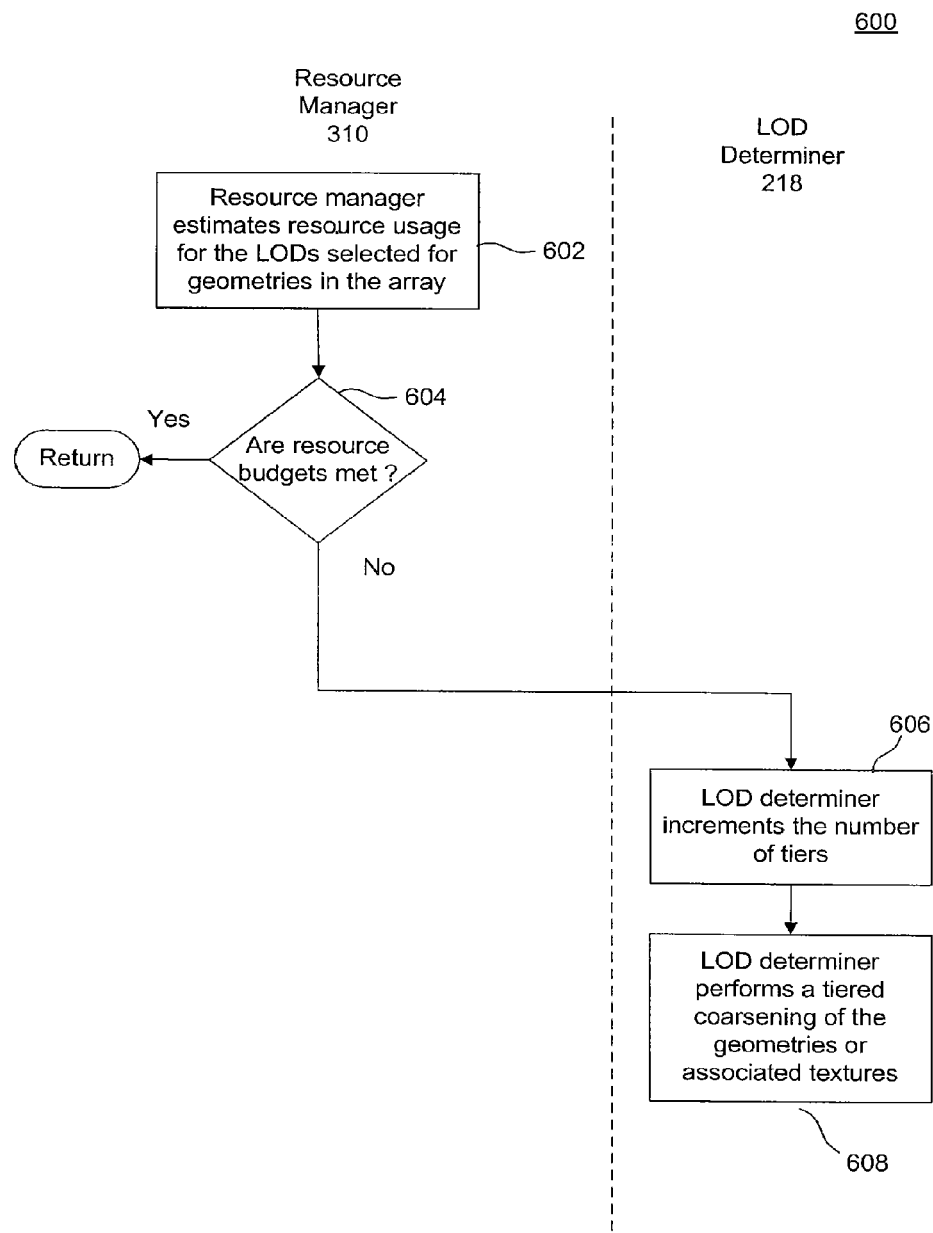
FIG. 6 is a flowchart illustrating control of resource usage according to an embodiment of the invention.

FIG. 6 illustrates method 600. Method 600 is an exemplary method that may be used by resource manager 310 to manage resource budgets.

Method 600 begins at step 602 where resource manager 310 estimates resource usage for LODs selected for geometries that may be stored in an array (step 602). In step 604, resource manager 310 checks if resource budgets are met. As an example, resource budgets may be based on texture memory, update bytes per frame and main memory. If resource budgets are met, method 600 returns. If resource budgets are not met (step 604), frame updater/LOD determiner 218 increments a number of tiers associated with geometries (step 606) and performs a tiered coarsening of geometries or their associated textures (step 608).

In this way, by performing a tiered coarsening of geometries, resource manager 310 may manage resource budgets.

2.5 Combining Geometries

In an embodiment, a combiner represents a single texture in a texture LOD tree and all of the geometry objects that are currently displayed using that texture.

An LOD decision process, for example illustrated in method 406, computes the correct texture LOD level to use for each geometry object. Due to resource budgets, multiple decisions may be made for the same geometry object. In this case, frame updater/LOD determiner 218 may override a geometry's level from the previous decision only if the newer level represents a finer-resolution texture.

If the final texture chosen to use for a geometry differs from the one used previously, then the combiner representing the previous texture (if any) is marked as change (and the combiner representing the new texture is marked as changed. If a geometry that was previously in view is no longer in view, then all combiners for textures the geometry was previously displayed with are also marked as changed by frame updater/LOD determiner 218. Marking a combiner as changed means that the set of geometry objects that use the texture needs to be updated at the current frame. This causes part of the scene graph associated with the combiner to be rebuilt by the frame updater/LOD determiner 218.

In an embodiment, updates to a scene graph generated by client 210, may be optimized by knowing whether objects of interest and quad nodes have or have not changed since a last image frame rendered by scene graph display 220. In an embodiment, method 406 may gather this information while determining levels of detail. In another embodiment, not intended to limit the invention, all references to a geometry object may be examined before deciding on the correct level of detail. Additionally, combiner 320 may be instantiated by frame updater/LOD determiner 218 to gather geometry per texture or per quadnode. It is to be appreciated that frame updater/LOD determiner may instantiate a plurality of combiner(s) 320.

Additionally for each quadnode, an additional boolean variable may be maintained which may be used to detect any change to any of the combiner(s) 320 that may affect a current quadnode or one of its descendants. Finding the correct combiner to use for a piece of geometry requires either hopping up the chain of texture LODs, or hopping down.

Figure 7:
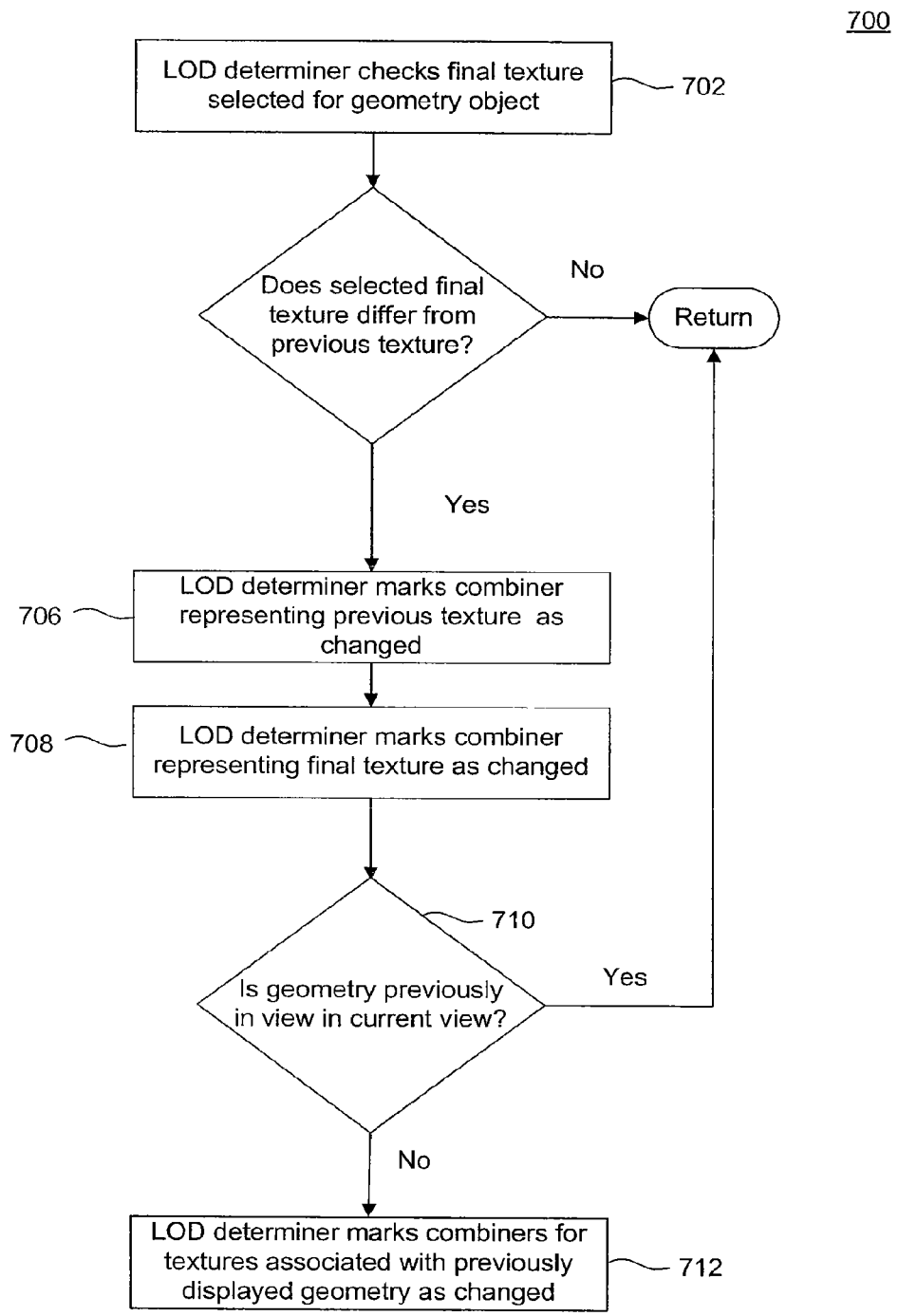
FIG. 7 is a flowchart illustrating the use of a combiner according to an embodiment of the invention.

FIG. 7 illustrates method 700. Method 700 may be used to mark combiners as being changed based on whether a geometry is currently in view.

Method 700 begins at step 702 with frame updater/LOD determiner 218 checking a final texture that has been selected for a geometry object. Frame updater/LOD determiner 218 checks if a selected final texture differs from a previously selected texture (step 704). If a selected final texture does not differ from a previously selected texture (step 704) method 700 returns. If a selected final texture differs from a previously selected texture (step 704), a combiner representing the previous texture is marked as changed by frame updater/LOD determiner 218 (step 706). Frame updater/LOD determiner then marks a combiner representing the final texture as changed (step 708). Frame updater/LOD determiner 218 then checks if geometry that was previously in view is within a current view (step 710). If geometry that was previously in view is within a current view (step 710), method 700 returns. If geometry that was previously in view is not within a current view (step 710), combiners for textures associated with the previously displayed geometry are also marked as changed (step 712).

In this way, frame updater/LOD determiner 218 selectively marks combiners as being changed.

2.6 Scene Graphs

In an embodiment, a scene graph may be considered to be a representation that includes information about the geometry and appearance of all objects appearing on a graphical display. As an example, a scene graph may be a dynamic data structure within a computer program. A scene graph may include data that describes shape objects (geometry and appearance), geometric structure relationships (geometric transformations, ordering, and grouping), global objects (how all shape objects are viewed, e.g., viewpoints, lights, backgrounds), and behaviors (procedures for modifying information stored in a scene graph).

As an example, not intended to limit the invention, a scene graph is implemented using object-oriented computer programming techniques. Thus, scene graph objects can be provided as object-oriented software objects, which describe may describe shape objects. For example, a scene graph can include a software object associated with an building image, and a scene graph display command can operate on the building object to render the building image on a graphical display.

Objects of a scene graph, for example, may be generated using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs". The scene graph data structure described above underlies the tree structure representation. The scene graph can also be associated with a sequence of display commands, which can be used to generate the underlying data structure of the scene graph.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programmer interfaces (APIs) have been established to create a scene graph when presented with the scene graph display commands. For example Java3D and VRML provide high-level software to generate a scene graph. Lower level APIs have also been provided, including Open GL, and Direct 3D. Application software, for example computer games, has been developed to provide the scene graph display command to an API.

2.7 Scene Graph Generation

In an embodiment, after LOD decisions have been revisited, any combiner which may have changed, may need to recollect geometries associated with itself. During scene graph generation frame updater/LOD determiner 218 may visit the geometries in the array from phase 3, processing combiners for each piece of each geometry object.

2.8 Scene Graph Display

In an embodiment, a scene graph generated and updated by frame updater/LOD determiner 218 may be provided to scene graph display 220. Scene graph display renders a scene graph for display so that a scene may be viewed by a user of client 210.

As an example, scene graph display 220 may be associated with a 3D graphics circuit board, having local processing capability on the graphical circuit board, and having the ability to interpret scene graph data and rapidly provide a corresponding graphical display on a monitor.

Exemplary scene graph programming techniques, in conjunction with the 3D graphic circuit board, provide the ability to rapidly render a 3D image on a graphical display. Images on the graphical display can also be rapidly updated with one or more display commands, provided by the application software, interpreted by the API, and sent to the 3D graphics circuit board.

In this way, a scene graph may be rendered by scene graph display 220.

3. Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method of rendering textures at multiple resolutions, comprising:
   (a) determining, with one or more processors, a resolution level for each object of interest in a frame;
   (b) recursively traversing a quadtree that includes one or more objects of interest sharing the same resolution level;
   (c) testing a texture coordinate associated with the objects of interest;
   (d) identifying a child texture sub-window the texture belongs to based on the testing step;
   (e) accumulating texture replacement transforms concurrently with the traversing step; and
   (f) drawing all primitives when said recursively traversing step reaches a desired level of the quadtree based on output of the accumulating step,
   wherein steps (a)-(f) are implemented on the one or more processors.

2. The method of claim 1, wherein the resolution level is a meters/pixel ratio.

3. The method of claim 1, wherein the one or more objects of interest are one or more buildings.

4. The method of claim 1, wherein testing the texture coordinate associated with the objects of interest includes testing the texture coordinate and any children nodes beginning at the texture coordinate of the quadtree and traversing the quadtree recursively towards children nodes.

5. The method of claim 4, wherein test testing the texture coordinate associated with the objects of interest includes:
   determining if a node of the quadtree is in view;
   if the node of the quadtree is in view, computing a minimum target level range and a maximum target level range for the node;
   if the node of the quadtree is not in view, stopping traversal of the quadtree;
   applying a level of detail (LOD) bias to adjust the minimum target level range and the maximum target level range to create a node target level;
   determining whether the node target level of the quadtree is greater than a threshold level;
   if the node target level is greater than the threshold level, stopping traversal of a branch of the quadtree;
   if the node target level is not greater than the threshold level, choosing a target level for objects of interest associated with the quadtree; and
   traversing the children of the node of the quadtree.

6. The method of claim 5, wherein choosing a target level for objects of interest associated with the quadtree includes:
   determining if each object of interest is in view;
   if the object of interest is in view, determining if the node target level is narrow enough to be a reasonable approximation of a level of all of the objects associated with the node of the quadtree;
   if the node target level is narrow enough, using the threshold level as the target level for objects of interest associated with the quadtree;
   if the node target level is not narrow enough, computing a target level range for the object of interest and using the computed target level range as the target level for objects of interest associated with the quadtree.

7. A computer based system for storing aggregated textures at a plurality of resolutions, comprising:
   one or more processors;
   a proxy LOD generator to receive a plurality of textured objects and to generate proxy LODs;
   a data set merger to merge the textured objects from one or more data sets;
   a resolution level distributor to distribute one or more objects of interest associated with the textures and the proxy LOD(s) to a plurality of resolution levels associated with a quadtree;
   a texture LOD generator to generate a resolution pyramid for each texture associated with the objects of interest; and
   a texture aggregator to generate a plurality of texture trees associated with aggregated textures at multiple resolutions;
   wherein the proxy LOD generator, the data set merger, the resolution level distributor, the texture LOD generator and the texture aggregator are implemented on the one or more processors.

8. The system of claim 7, further comprising:
   a format converter to convert a plurality of aggregated textures into a transmission format.

9. The system of claim 7, wherein the resolution level is a meters/pixel ratio.

10. The method of claim 7, wherein the one or more objects of interest are one or more buildings.

* * * * *